US010743461B2

(12) United States Patent
Posselius et al.

(10) Patent No.: US 10,743,461 B2
(45) Date of Patent: Aug. 18, 2020

(54) AIR ASSIST SYSTEM FOR SPINNER SPREADERS

(71) Applicant: CNH Industrial America LLC, New Holland, PA (US)

(72) Inventors: John Posselius, Ephrata, PA (US); Tim Stombaugh, Nicholasville, KY (US)

(73) Assignee: CNH Industrial America LLC, New Holland, PA (US)

( * ) Notice: Subject to any disclaimer, the term of this patent is extended or adjusted under 35 U.S.C. 154(b) by 249 days.

(21) Appl. No.: 15/287,994

(22) Filed: Oct. 7, 2016

(65) Prior Publication Data

US 2017/0164551 A1 Jun. 15, 2017

Related U.S. Application Data

(60) Provisional application No. 62/267,467, filed on Dec. 15, 2015.

(51) Int. Cl.
*A01C 7/08* (2006.01)
*A01C 17/00* (2006.01)
*E01H 10/00* (2006.01)

(52) U.S. Cl.
CPC ............ *A01C 7/085* (2013.01); *A01C 17/001* (2013.01); *E01H 10/007* (2013.01)

(58) Field of Classification Search
CPC ..... A01C 7/085; A01C 17/001; E01H 10/007; E01H 10/003; E01H 10/008
USPC .................................. 239/681–689, 665, 666
See application file for complete search history.

(56) References Cited

U.S. PATENT DOCUMENTS

| 3,041,076 | A | | 6/1962 | Van Der Lely et al. |
| 3,482,735 | A | | 12/1969 | Goulter |
| 3,568,937 | A | | 3/1971 | Grataloup |
| 3,643,872 | A | | 2/1972 | Smith |
| 3,675,857 | A | | 7/1972 | Bourton |
| 3,926,377 | A | | 12/1975 | Johnson |
| 6,009,899 | A | * | 1/2000 | Polutnik ................. F16K 3/029 137/556.3 |

(Continued)

FOREIGN PATENT DOCUMENTS

WO 1996004774 A1 2/1996

OTHER PUBLICATIONS

Lai Chin Fook; Mechanical Fertiliser Spreaders for oil palm conditions; Air Assist Spreader; Retrieved on Oct. 9, 2013 from web-site; http://www.emdek.com.my/download/Spreaders_overview.PDF: pp. 1-16.

*Primary Examiner* — Jason J Boeckmann
(74) *Attorney, Agent, or Firm* — Rebecca L. Henkel; Rickard K. DeMille

(57) ABSTRACT

The present inventors have recognized that a spinner spreader system may be augmented with an air assist system in which an air current is generated to engage particles after they have left the spinner spreader system to thereby enhance the trajectory of the particles. In one aspect, one or more fans with appropriate ductwork may be added below one or more spinning disks to direct jets or curtains of air in the direction of the broadcast pattern of particles leaving the one or more disks. The directed air stream should preferably be faster than the particles leaving the one or more disks, thereby adding additional acceleration to the particles compensating opposing forces.

16 Claims, 7 Drawing Sheets

(56) References Cited

U.S. PATENT DOCUMENTS

| | | | |
|---|---|---|---|
| 6,406,368 B1 | 6/2002 | Cruson et al. | |
| 6,663,485 B2 | 12/2003 | Niermann | |
| 7,390,253 B2 | 6/2008 | Farley et al. | |
| 7,927,200 B2 | 4/2011 | Van Overschelde et al. | |
| 8,474,735 B2 * | 7/2013 | Hobbs, Jr. ............ | A01C 15/006 239/650 |
| 8,475,248 B2 | 7/2013 | Farley | |
| 9,562,333 B2 * | 2/2017 | Sandler ................ | E01C 19/203 |
| 2007/0066370 A1 | 3/2007 | Redekop et al. | |
| 2010/0133365 A1 * | 6/2010 | Bailey ................ | E01C 19/203 239/663 |

* cited by examiner

US 10,743,461 B2

AIR ASSIST SYSTEM FOR SPINNER SPREADERS

CROSS-REFERENCE TO RELATED APPLICATIONS

This is a non-provisional application based upon U.S. provisional patent application Ser. No. 62/267,467 entitled "Air Assist System for Spinner Spreaders," filed Dec. 15, 2015, which is incorporated herein by reference.

FIELD OF THE INVENTION

The present invention relates generally to spinner spreaders, and in particular, to air assist systems for spinner spreaders in which an air current is generated to engage particles after they have left the spinner spreader.

BACKGROUND OF THE INVENTION

Spinner spreaders for particulate material (particles) are well known in the art, including for agricultural application, lawn care and road maintenance application. Typically, such spreaders are mounted onto areas of machines, such as a truck body, truck chassis, trailer, or slid into a truck's dump body. The system typically includes a particulate material storage bin(s), a conveyor system(s) and rotating spinner disk(s). The conveyor transfers material from the storage bin(s) to the spinner(s). The spinner(s) broadcast the material across a field, lawn or road (broadcast area). Oftentimes a single spinner, or a pair of laterally spaced spinners, are provided, with a material divider plate positioned above the spinner(s) to direct the material from the discharge end of the conveyor(s) onto the spinner(s). A wide range of spinner diameters are in use with a general understanding that the amount of material to be spread and the size of the broadcast area are proportional to the diameter of the spinners.

In operation, the spinner spreader distributes particles by accelerating them with a centrifugal force imparted by the rotating spinning disk(s). However, as particles leave the disk, they are subjected to gravity and drag forces that typically effect their trajectory and ultimate deposition point. Particles with differing sizes, shapes, masses and/or densities will typically travel different distances before coming to rest on the ground. As a result, a disproportionate distribution of particles may occur, which may cause, for example, an undesirable stratification or layering of deposited material at outer edges of the broadcast area.

Disproportionate distribution is not typically of too much concern behind the machine as forward motion of the machine will generally equalize the overall distribution. However, disproportionate distribution on the swath edges, or sides of the distribution area, will oftentimes remain. As a result, an undesirable streaking effect may occur after the machine passes. Consequently, what is needed is an improved system in which particulate material may be evenly distributed without one or more of the foregoing disadvantages.

SUMMARY OF THE INVENTION

The present inventors have recognized that a spinner spreader system may be augmented with an air assist system in which an air current is generated to engage particles after they have left the spinner spreader system to thereby enhance the trajectory of the particles. In one aspect, one or more fans with appropriate ductwork may be added below one or more spinning disks to direct jets or curtains of air in the direction of the broadcast pattern of particles leaving the one or more disks. The directed air stream should preferably be faster than the particles leaving the one or more disks, thereby adding additional acceleration to the particles compensating opposing forces.

Accordingly, drag forces which cause some particles to slow down more quickly at the outer edges of the distribution pattern may be reversed at the beginning of the trajectory, meaning such particles may be accelerated more than others. This may result in equalizing particle distribution by the time the particles reach the edge of the swath pattern.

Aside from reducing particle stratification, the air assist system may also increase the travel distance of all particles, thereby making the overall spread pattern wider. Active control of the air stream could also be used to compensate for wind/environmental effects on the pattern distribution.

Specifically then, one aspect of the present invention provides a particulate material distribution system including: a rotating spinner disk configured to impart a centrifugal force for distributing particles in a broadcast direction; and an air assist system including a fan. The air assist system is configured to direct an air current in the broadcast direction to engage the particles after they have left the rotating spinner disk.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
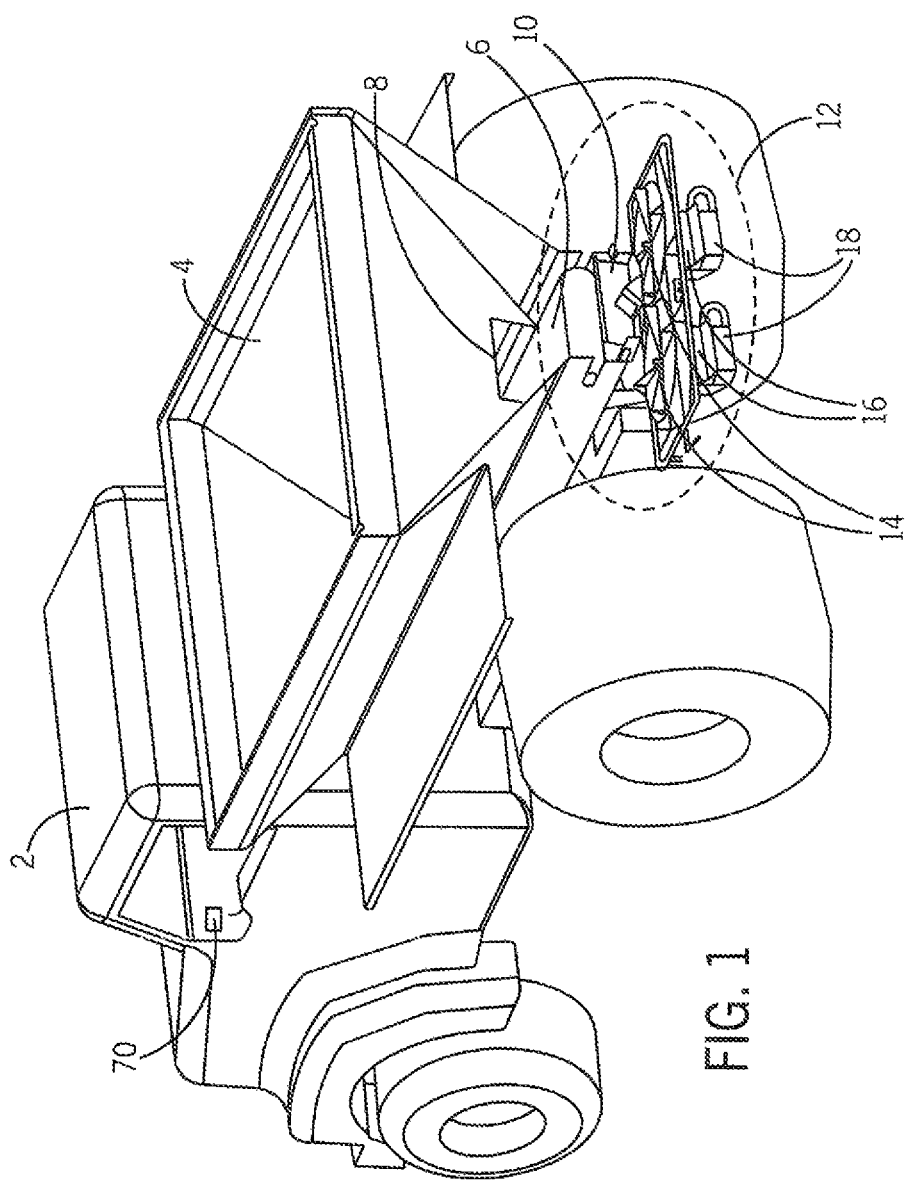
FIG. 1 is a perspective view of an exemplar truck for distributing particulate material with an air assist system in accordance with an aspect of the invention.

Referring now to FIG. 1, a perspective view of an exemplar truck 2 for distributing particulate material is provided in accordance with an aspect of the invention. The truck 2 may include a material storage bin 4 with sloping side walls and a belt conveyor 6 for transporting material to a discharge opening 8. Mounted at a rear of the material storage bin 4 at a discharge end of the belt conveyor 6 is a material divider 10. Mounted below the material divider 10 is a spinner spreader apparatus 12. The spinner spreader apparatus 12 may include rotating spinner disks 14 (centrifugal broadcast spreaders) mounted to respective motors 16. The spinner disks 14 are positioned to accept particulate materials (particles) falling from an end of the belt conveyor 6 and through the material divider 10. The spinner spreader apparatus 12 also includes one or more air assist systems 18 provided in accordance with an aspect of the invention.

Figure 2:
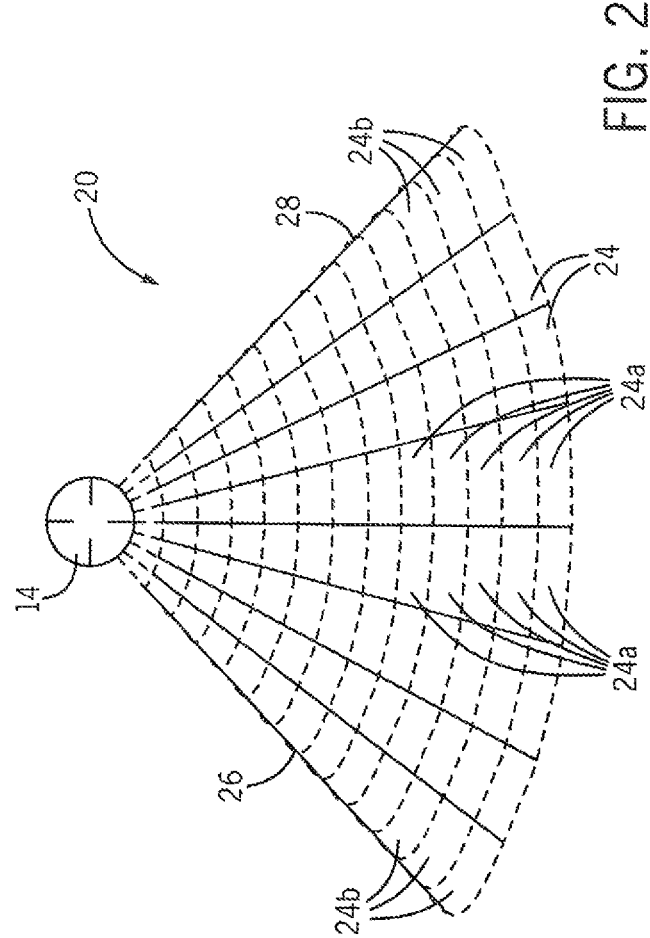
FIG. 2 illustrates an exemplar distribution or broadcast area for distributing the particulate materials.
Figure 3:
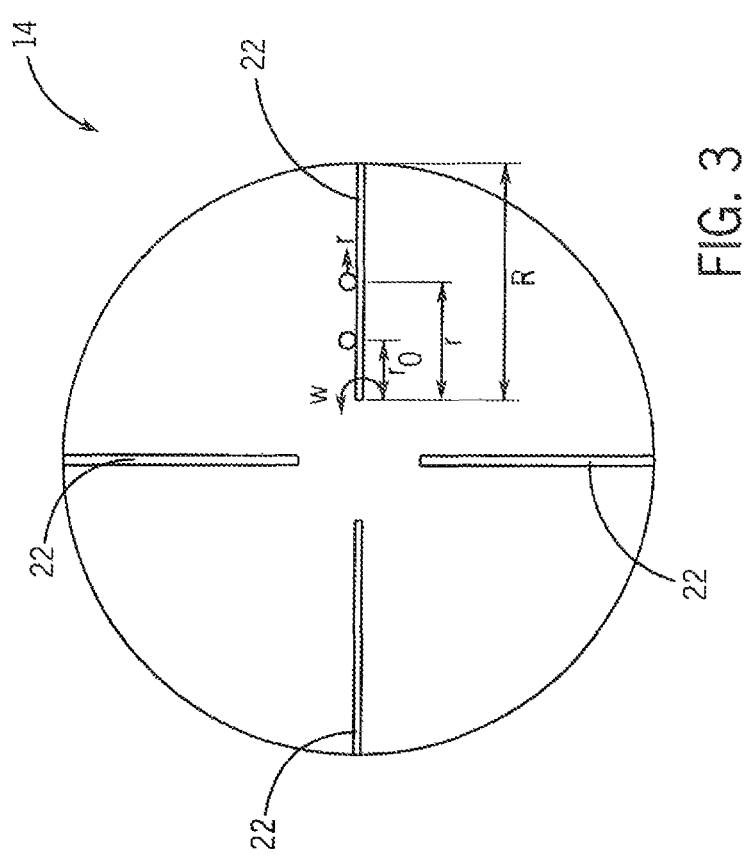
FIG. 3 is an exemplar rotating spinner disk configured to impart a centrifugal force for distributing the particulate material in a broadcast direction.

Referring now to FIGS. 2 and 3, an exemplar distribution or broadcast area 20 of a single spinner disk distributing the particulate materials is provided in accordance with an aspect of the invention. The spinner disk 14 typically spins from a height (H) above the ground with a rotation speed (w). The spinner disk 14 then receives particles, such as seeds, dry fertilizers, pesticides, and/or other granular materials, falling onto the spinning disk within a drop radius ($r_0$). The particles are typically received against vanes 22, and are accelerated along the vanes 22 through a radius (R) of the spinning disk. As a result, a centrifugal force is imparted upon the particles as they are released from the spinner disk 14, causing the particles to travel along various trajectories through the air and away from the spinner disk 14. The particle will typically land in a region 24 (a subset of regions 24 identified in FIG. 2 by way of example) of the broadcast, area 20, between first and second outer edges 26 and 28, respectively, depending on the direction of vane 22 in contact with particles as they are released. The distance particles may travel could be on the order of 15 meters, depending on the desired effective working range and forces acting on the particle.

However, due to various factors, such as particle shape, particle size distribution, particle density, particle motion, friction coefficients, environment/wind and the like, particles may travel non-uniformly, thereby causing disproportionate distributions of particles. Disproportionate distribution of particles is not typically of too much concern in regions behind the machine, such as regions 24a, as forward motion of the machine (such as on the order of 10 miles per hour) will generally equalize the overall distribution. However, disproportionate distribution on the swath edges, or sides of the distribution area, such as regions 24b, will oftentimes remain. As a result, if left unaddressed, undesirable streaking effects could occur after the truck 2 or other machine passes.

In accordance with an aspect of the invention, the spinner disk 14 may be augmented with an air assist system in which an air current is generated to engage the particles after they have left the disk to thereby enhance the trajectory of the particles. Accordingly, drag forces which cause some particles to slow down more quickly at the first and second outer edges 26 and 28, respectively, of the broadcast area 20 may be reversed at the beginning of the trajectory, meaning such particles may be accelerated more than others. This may result in equalizing particle distribution by the time the particles reach the edges of the broadcast area 20.

Figure 4:
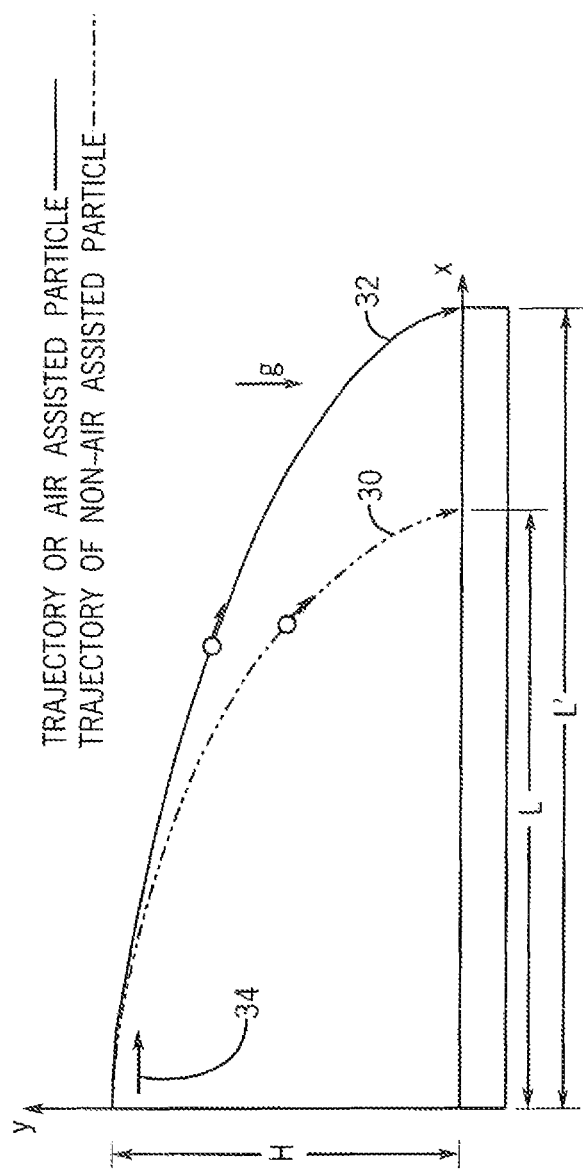
FIG. 4 is diagram illustrating a trajectory of a first particulate material traveling without an air current provided by an air assist system and a trajectory of a second particulate material traveling with an air current provided by an air assist system.

Referring now to FIG. 4, a diagram comparing a first trajectory 30 of a particulate material traveling without an augmenting air current during a first time period, with a second trajectory 32 of the same particulate material traveling with an air current provided by an air assist system during a second time period, is provided. Due to the configuration of the particle drag, such as with respect to the particle's shape, size distribution, density, motion, and the like, and due to competing forces of drag and gravity (g), a fixed centrifugal force projecting the particle from a height (H) may land the particle at a lateral distance (L) from the spinner disk 14. However, due to an air current 34 activated to engage the particle in the second time period, the fixed centrifugal force projecting the particle from the height (H) may land the particle at further a lateral distance (L') from the spinner disk 14.

Figure 5:
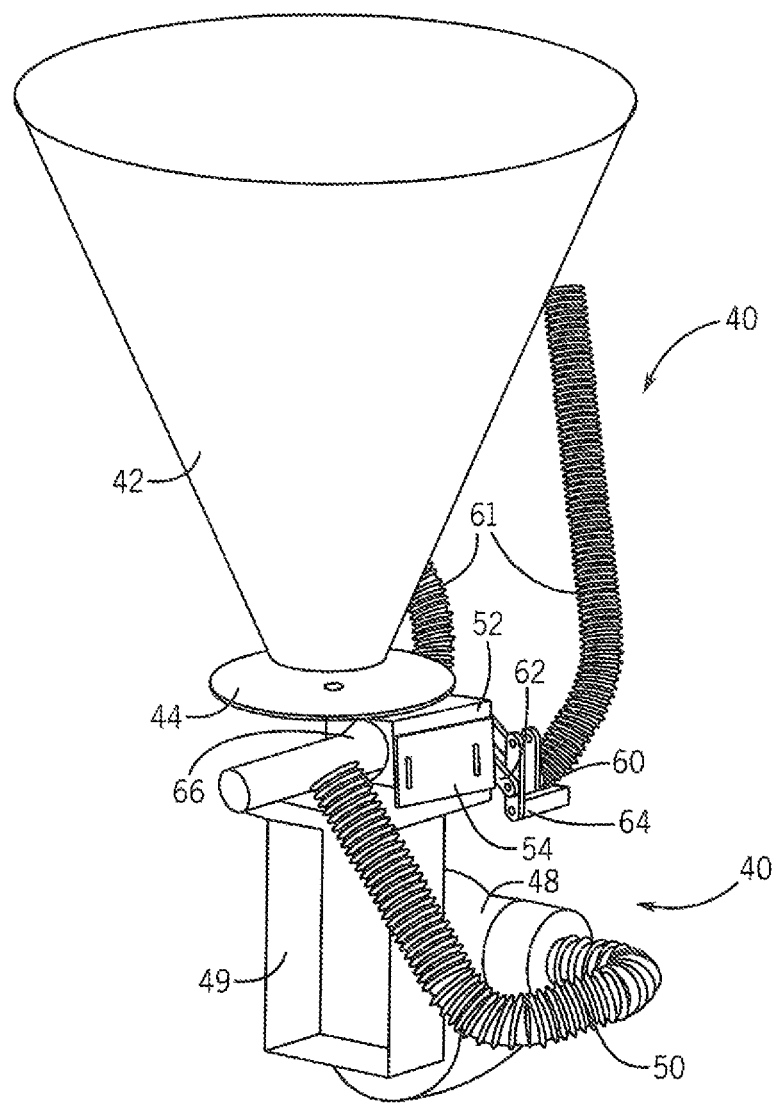
FIG. 5 is an isometric view of an exemplar spinner spreader apparatus including a rotating spinner disk and an air assist system.

Referring now to FIG. 5, an isometric view of an exemplar spinner spreader apparatus 40 is provided in accordance with an aspect of the invention. The spinner spreader apparatus 40 may be part of a particulate material distribution system mounted to the truck 2 or other machine, and may generally include a storage bin 42, a rotating spinner disk 44 and an air assist system 46 as described above with respect to FIGS. 1-4.

Figure 6:
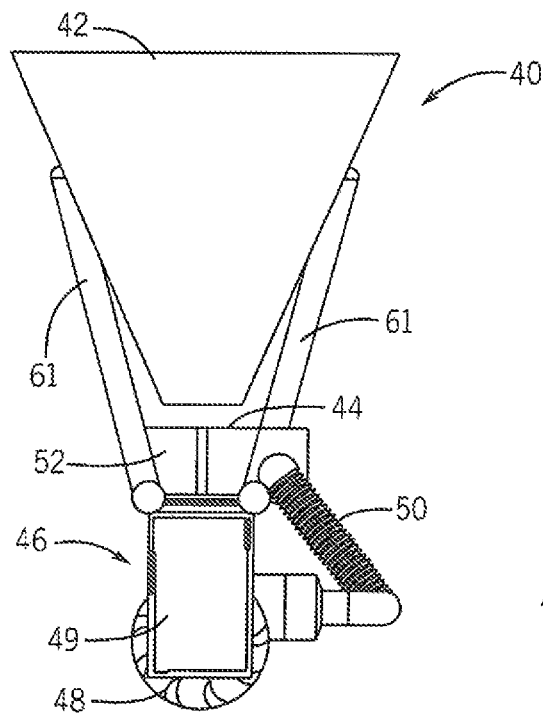
FIG. 6 is a front view of the spinner spreader apparatus of FIG. 5.
Figure 7:
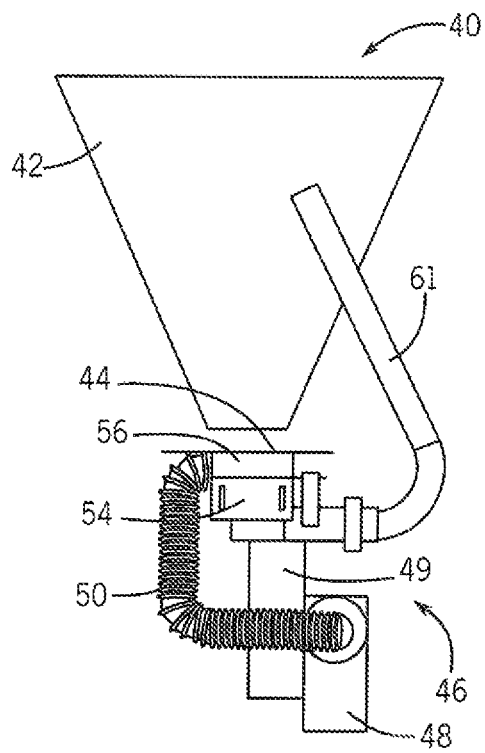
FIG. 7 is a side view of the spinner spreader apparatus of FIG. 5.
Figure 8:
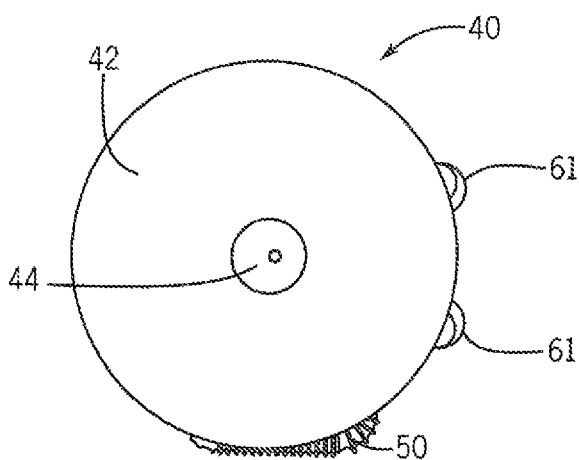
FIG. 8 is a plan view of the spinner spreader apparatus of FIG. 5.
Figure 9:
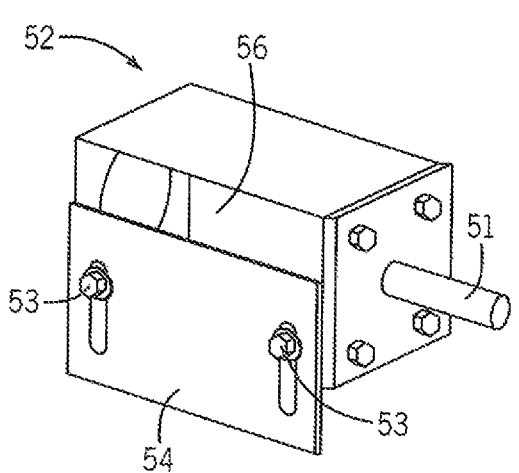
FIG. 9 is an isometric view of an air box of the spinner spreader apparatus of FIG. 5.
Figure 12:
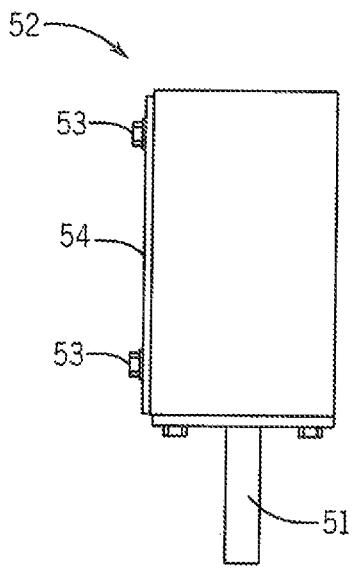
FIG. 12 is a plan view of the air box of FIG. 9.
Figure 10:
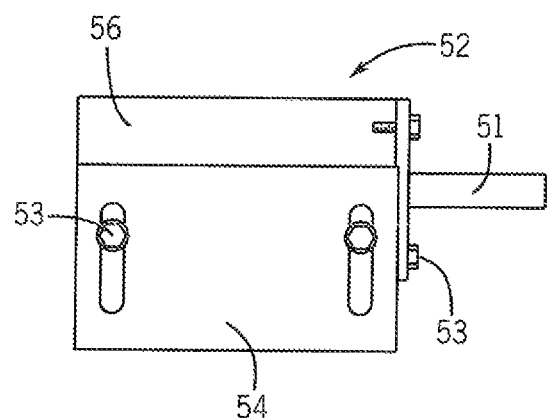
FIG. 10 is a front view of the air box of FIG. 9.
Figure 11:
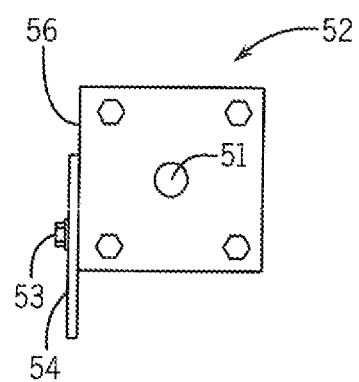
FIG. 11 is a side view of the air box of FIG. 9.

Particles held in the storage bin 42 may be metered onto the spinner disk 44 in which a centrifugal force is imparted to distribute the particles in a broadcast direction. The air assist system 46 may include a blower or fan 48, such as a ducted centrifugal or squirrel cage fan, drawing ambient air in order to generate an air current. The fan 48 could be, for example, a Fasco Centrifugal Blower, B75, 115 Volts, 3000 RPM, capable of a maximum flow rate (magnitude) of about 75 cubic feet per minute. The fan may be supported by a mounting bracket 49 positioned below a frame work 61 or support braces of the spinner spreader apparatus 40. The air current may be directed through ductwork 50, such as a bendable PVC duet hose, to an inlet 51 of an air box 52. The air box 52, in turn, may direct the air current outward in the broadcast direction, preferably at a flow rate (magnitude) of about 60 cubic feet per minute, in order to engage the particles after they have left the spinner disk 44. See also FIGS. 6-8 which provide front, side and plan views, respectively, of the spinner spreader apparatus 40.

Preferably, the air box 52 may be positioned directly under the spinner disk 44. Referring also to FIGS. 9-12 illustrating isometric, front, side and plan views of the air box 52, a sliding door 54 positioned over the front of the air box 52 may be used to control the velocity or magnitude of the air current by altering an outlet area 56. Retaining fasteners 53 may be provided for holding the sliding door 54 in a desired position to adjust the outlet area 56. Accordingly, the air box 52 may be adjustable with respect to the magnitude of the air current.

In addition, the air box 52 may be configured to change an air current angle in all planes (X-Y, X-Z and Y-Z) for improving accuracy as, may be desired. One approach to accomplish this could be, for example, attaching the air box 52 to multi joint pivot arms 60, which may be attached, in turn, to the frame work 61 or support braces of the spinner spreader apparatus 40. A first pivot arm 62 on the air box 52 may allow for a tilt motion. The first pivot arm 62 may then connect to a second pivot arm 64 which may allow for upward movement of the system. A final section may allow for maneuverability and may provide an anchor point for the air assist system 46. Accordingly, the air box 52 may be adjustable with respect to direction of the air current.

The air assist system 46 could also include an air filter 66. The air filter 66 may be configured to filter the air current of environmental contaminants before directing the air current in the broadcast direction.

In another aspect, a control system 70 (see FIG. 1) may be in communication with electronically controlled actuators of the air assist system 46. Accordingly, the control system 70 could be operated by a user to electronically adjust a direction of the air current and/or a magnitude of the air current, such as from a cab of the truck 2.

The air assist system 46 could also be made out of a molded plastic that could be maneuvered into different positions easily. Accordingly, it could be configured to be light weight, capable of resisting dynamic stresses applied to it, and/or weather/corrosion resistant. The air assist system 46 could also be implemented as an add-on feature to existing spreader machines.

By forcing more air on to granular particles passing through a spinner spreader, the granular particles may be accelerated after exiting the disk. This may help disperse the granular particles more evenly via forced air and create a more uniform distribution pattern. It will be appreciated that numerous alternative mechanisms may be provided for forcing air and uniformly distributing granular particles within the scope of the invention.

Although the best mode contemplated by the inventors of carrying out the present invention is disclosed above, practice of the above invention is not limited thereto. It will be manifest that various additions, modifications and rearrangements of the features of the present invention may be made without, deviating from the spirit and the scope of the underlying inventive concept.

What is claimed is:

1. A particulate material distribution system comprising:
- a rotating spinner disk configured to impart a centrifugal force for distributing particles in a broadcast direction through an atmosphere and onto a surface, the spinner disk including a first side lying in a plane for receiving the particles thereon and a second side below the first side; and
- an air assist system including:
  - a fan configured to generate an air current; and
  - an air box operatively connected to the fan by ductwork and including an upper surface positioned alongside and below the second side of the rotating spinner disk, the air box further including a sliding door defining an outlet of the air box that allows for the air current to exit the air box, lies in a plane generally perpendicular to the upper surface of the air box and is positioned adjacent to and below the plane of the first side of the spinner disk; and
  - a multi joint pivot arm operatively connected to the air box for supporting the air box alongside and below the second side of the rotating spinner disk, the multi joint pivot arm including a first pivot arm configured to tilt the air box and adjust a direction of the air current exiting the air box and a second pivot arm configured to allow vertical movement of the air box;

wherein:
- the air current exiting the outlet defined by the sliding door of the air box passes directly into the atmosphere in the air current direction to engage the particles after the particles leave the rotating spinner disk and before the particles engage the surface; and
- the outlet of the air box has an adjustable dimension to vary a magnitude of air current passing therethrough.

2. The distribution system of claim 1, wherein the air box is adjustable with respect to direction of the air current.

3. The distribution system of claim 1, wherein the air assist system includes an air filter configured to filter the air current before directing the air current in the broadcast direction.

4. The distribution system of claim 1, wherein the fan is a ducted centrifugal fan.

5. The distribution system of claim 1, further comprising a control system in communication with the air assist system, wherein the control system is operable to electronically adjust at least one of a direction and a magnitude of the air current.

6. The distribution system of claim 1, further comprising a storage bin for metering particulate material to the rotating spinner disk.

7. The distribution system of claim 1, wherein the rotating spinner disk includes a plurality of vanes for accelerating particulate material.

8. A machine for distributing particulate material comprising:
- a storage bin for holding particulate material;
- a conveyor in communication with the storage bin, the conveyor being configured to transport the particulate material to a discharge opening; and
- a spinner spreader in communication with the discharge opening, the spinner spreader including:
  - a rotating spinner disk configured to impart a centrifugal force for distributing the particulate material in a broadcast direction through an atmosphere and onto a surface, the spinner disk having a first side directed towards the discharge opening and a second side directed away from the discharge opening;
  - an air assist system including a fan configured to generate an air current and an air box mounted directly below and adjacent to the rotating spinner disk, interconnected to the fan by ductwork, and including:
    - an upper surface positioned alongside and below the second side of the rotating spinner disk; and
    - a sliding door defining an outlet adjacent the second side of the spinner disk that that allows for the air current to exit the air box and lies in a plane generally perpendicular to the upper surface of the air box; and
  - a multi joint pivot arm operatively connected to the air box for supporting the air box alongside and below the second side of the rotating spinner disk, the multi joint pivot arm including a first pivot arm configured to tilt the air box and adjust a direction of the air current exiting the air box and a second pivot arm configured to allow vertical movement of the air box;

wherein the air current exiting the outlet defined by the sliding door of the air box passes directly into the atmosphere in the air current direction to engage the particulate material after the particulate material leaves the rotating spinner disk and before the particulate material is distributed on the surface.

9. The machine of claim 8, wherein the air box is adjustable with respect to direction of the air current.

10. The machine of claim 8, wherein the air box is adjustable with respect to magnitude of the air current.

11. The machine of claim 10, wherein the sliding door is positionable at a user selected position for adjusting the magnitude.

12. The machine of claim 8, wherein the air assist system includes an air filter configured to filter the air current before directing the air current in the broadcast direction.

13. The machine of claim 8, wherein the fan is a ducted centrifugal fan.

14. The machine of claim 8, further comprising a control system in communication with the air assist system, wherein the control system is operable to electronically adjust at least one of a direction and a magnitude of the air current.

15. The machine of claim 8, wherein the rotating spinner disk includes a plurality of vanes for accelerating particulate material.

16. The machine of claim 8, wherein the machine is a truck.

\* \* \* \* \*